United States Patent Office.

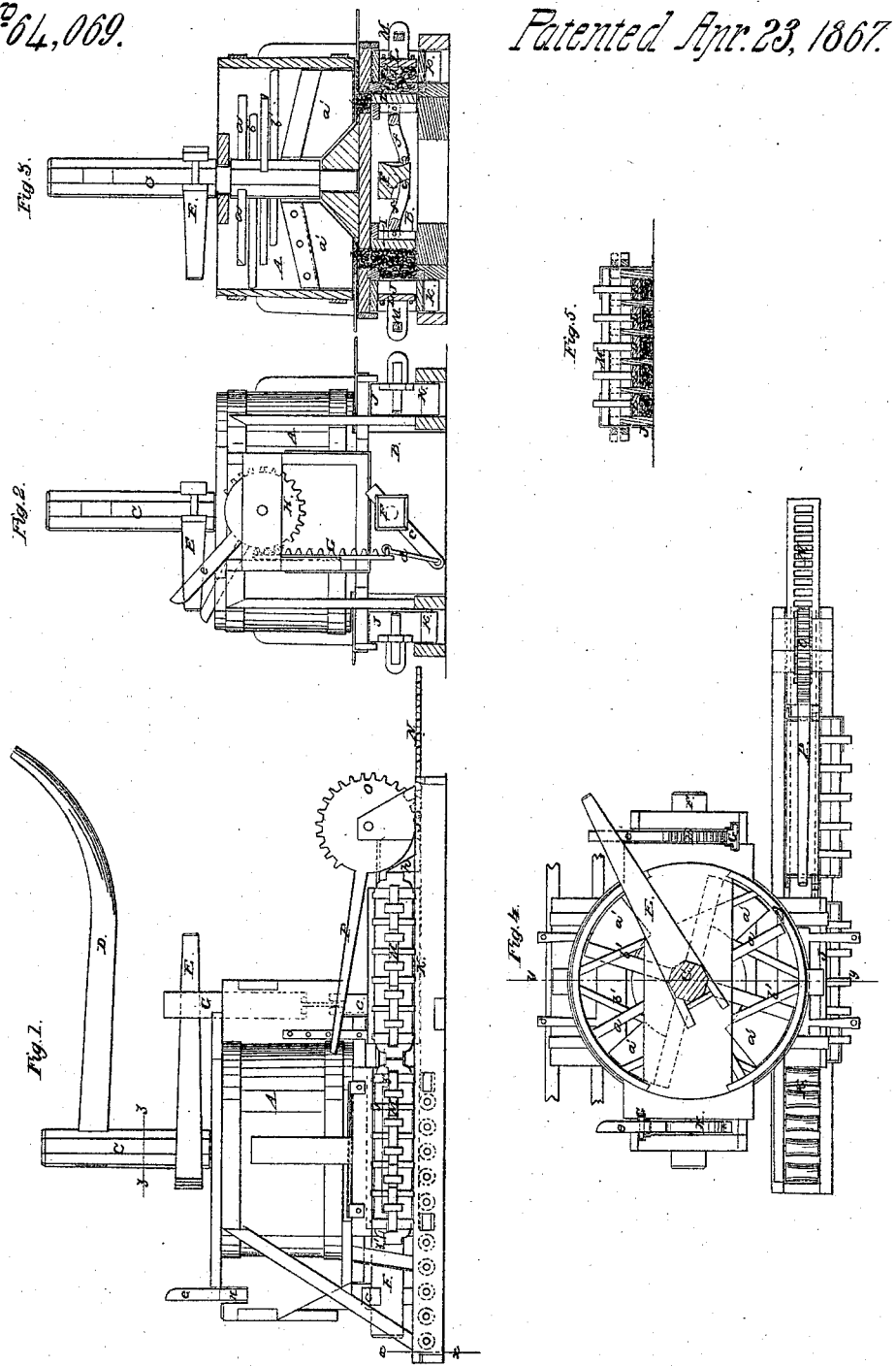

JOHN W. BURNS, OF HENRY, ILLINOIS.

Letters Patent No. 64,069, dated April 23, 1867.

---

IMPROVED BRICK MACHINE

---

*The Schedule referred to in these Letters Patent and making part of the same.*

---

TO ALL WHOM IT MAY CONCERN:

Be it known that I, JOHN W. BURNS, of Henry, in the county of Marshall, and State of Illinois, have invented a new and improved Brick Machine; and I do hereby declare that the following is a full, clear, and exact description thereof, which will enable others skilled in the art to make and use the same, reference being had to the accompanying drawings, forming a part of this specification.

This invention relates to a new and improved machine for moulding and pressing brick, and it consists in a novel manner of operating the plungers by which the ground or tempered clay is forced into the moulds, and also in a novel arrangement of the plungers with the mud-mill, whereby the clay may be moulded and pressed into bricks very expeditiously and in a perfect manner. In the accompanying sheet of drawings—

Figure 1 is a front elevation of my invention.

Figure 2, a side view of the same, partly in section, as indicated by the line $x\ x$, fig. 1.

Figure 3, a vertical central section of the same, taken in the line $y\ y$, fig. 4.

Figure 4, a horizontal section of the same, taken in the line $z\ z$, fig. 1.

Figure 5, a detached horizontal section of a mould, taken in the line $z'\ z'$, fig. 1.

Similar letters of reference indicate like parts.

A represents the mud-mill, which may be of cylindrical or other form, and is placed upon a hollow base, B, shown in figs. 2 and 3. C is a vertical shaft placed centrally in the mud-mill, and having horizontal arms $a$ projecting radially from it, and also pressers $a'$ attached to its lower part, the pressers being of spiral form, and working over openings $b\ b$, in the bottom of the mud-mill, and forcing the clay through said openings into the moulds. The mud-mill has stationary or fixed bars, $b'$, secured horizontally in it, and at such points as to admit of the arms $a$, while rotating, just clearing them. The shaft C has a sweep, D, attached to it near its upper end, and to the shaft, below the sweep D, an arm, E, is secured, the use of which will be presently shown. Through the hollow base B of the machine, a shaft, F, passes, having an arm, $c$, at each end. These arms project from the shaft F in opposite directions, and each arm is connected by a link, $d$, with an upright rack, G. These racks are fitted in suitable guides at the exterior of the mud-mill, at opposite sides thereof, and into each rack a pinion or toothed segment, H, gears, said pinions or segments being provided each with an arm, $e$. To the shaft F, within the hollow base B, two plungers I I are attached by links $f$. These plungers are at opposite sides of the shaft F, and they extend the whole length or width of the base B, and work underneath the openings $b\ b$, in the bottom of the mud-mill, and force the clay into moulds J, which are placed on beds, K K, of friction-rollers at opposite sides of the mud-mill. The openings in the base B, through which the clay is pressed into the moulds, are provided with vertical bars, which are in line with the partitions of the moulds J, where the latter are placed in position to receive the clay, and the compartments of the moulds are provided with plungers L, each of which is provided with a projecting stem, a bar, M, passing through the stems of the plungers of each mould, as shown clearly in fig. 5. The empty moulds are shoved along opposite the openings in the base B, where they receive the clay, and the filled moulds discharged therefrom, by means of a rack, N, operated by a pinion, O, having a handle or lever, P, attached, the inner end of the rack having an upright head, $h$, to bear against the mould in front of it, (see fig. 1.) Each bed K is provided with a rack, N, but only one is shown in fig. 4. The clay, properly moistened, is thrown into the mud-mill, where it is thoroughly ground and tempered, and the pressers $a'\ a'$ force the same through the openings $b\ b$, into the base B, in front of the plungers I I, which alternately force the clay into the moulds. The plungers I I are operated by the turning of the shaft F, which is accomplished by the arm E, on the shaft $c$, coming in contact with the arms $e$ of the pinions or segments H, the shaft F being turned first in one direction and then in the other, so that the plungers I I will be operated alternately. By this machine brick may be moulded and pressed with the greatest facility, and in a perfect manner.

Having thus described my invention, I claim as new, and desire to secure by Letters Patent—

1. Operating the plungers I I, through the medium of the shaft F, connected by arms and links to vertical racks G, pinions or segments H, provided with arms $e$, and the arm E, on shaft C, all being arranged substantially as herein shown and described.

2. The arrangement of the mud-mill A, plungers I I, and moulds J, substantially as herein set forth.

3. The feeding of the empty moulds to receive the clay, and the discharging of the filled moulds from the press, by means of the racks N, and pinions O, substantially as shown and described.

JOHN W. BURNS.

Witnesses:
E. L. MARQUIS,
H. S. DOTY.